United States Patent
Attal et al.

(10) Patent No.: US 10,793,738 B2
(45) Date of Patent: Oct. 6, 2020

(54) COATING COMPOSITION, A COATED ARTICLE, AND METHOD OF FORMING SUCH ARTICLES

(75) Inventors: Jamel F. Attal, Midland, MI (US); Jouko Vyorykka, Richterswil (CH); Pekka Salminen, Galgenen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/740,299

(22) PCT Filed: Nov. 14, 2008

(86) PCT No.: PCT/US2008/083569
§ 371 (c)(1),
(2), (4) Date: Jul. 15, 2010

(87) PCT Pub. No.: WO2009/064993
PCT Pub. Date: May 22, 2009

(65) Prior Publication Data
US 2010/0279113 A1    Nov. 4, 2010

Related U.S. Application Data

(60) Provisional application No. 60/988,222, filed on Nov. 15, 2007.

(51) Int. Cl.
| | | |
|---|---|---|
| *C09D 5/02* | (2006.01) | |
| *C08L 33/02* | (2006.01) | |
| *C09D 123/08* | (2006.01) | |
| *C08L 51/04* | (2006.01) | |
| *C08L 53/02* | (2006.01) | |
| *C08L 33/08* | (2006.01) | |

(52) U.S. Cl.
CPC ........ *C09D 123/0815* (2013.01); *C08L 33/08* (2013.01); *C08L 51/04* (2013.01); *C08L 53/02* (2013.01); *C08L 2205/02* (2013.01); *Y02P 20/582* (2015.11); *Y10T 428/2915* (2015.01); *Y10T 428/3179* (2015.04)

(58) Field of Classification Search
CPC ........ C09D 123/0815; C09D 123/0823; Y02P 20/582; Y10T 428/3179; Y10T 428/2915; C08L 53/02; C08L 2205/02; C08L 33/08; C08L 51/04
USPC .................. 442/59, 97, 98, 99; 428/365, 391
See application file for complete search history.

(56) References Cited

U.S. PATENT DOCUMENTS

| | | | |
|---|---|---|---|
| 3,585,104 A | 6/1971 | Kleinert | |
| 3,645,992 A | 2/1972 | Elston | |
| 4,076,698 A | 2/1978 | Anderson et al. | |
| 4,297,860 A | 11/1981 | Pacifici et al. | |
| 4,447,570 A * | 5/1984 | Cook et al. | 524/127 |
| 4,594,130 A | 6/1986 | Chang et al. | |
| 4,599,392 A | 7/1986 | McKinney et al. | |
| 4,773,110 A | 9/1988 | Hopkins | |
| 4,793,898 A | 12/1988 | Laamanen et al. | |
| 4,798,081 A | 1/1989 | Hazlitt et al. | |

(Continued)

FOREIGN PATENT DOCUMENTS

| | | |
|---|---|---|
| JP | 2003055596 | 2/2003 |
| JP | 2003292869 | 10/2003 |

(Continued)

OTHER PUBLICATIONS

Aksoy, B., "Effect of coating additives on the rheological and optical properties of coated papers," Ph.D. dissertation, WesternMichigan University, Kalamazoo, MI, USA, pp. 20-25, 2005. (Year: 2005).*
International Search Report (PCT/US2008/083569).
Williams, T. and Ward, I.M., The Construction of a Polyethylene Calibration Curve for Gel Permeation Chromatography Using Polystyrene Fractions, Journal of Polymer Science: Polymer Letters, 1968, pp. 621-624, vol. 6, H.H. Wills Physics Laboratory, England.
Wild, L., et al., Determination of Branching Distributions in Polyethylene and Ethylene Copolymers, Journal of Polymer Science, 1982, pp. 441-455, vol. 20.
Randall, James C., A Review of High Resolution Liquid 13Carbon Nuclear Magnetic Resonance Characterizations of Ehtylene-Based Polymers, JMS-Rev. Macromol. Chem. Phys., 1989, pp. 201-317, C29(2&3), Exxon Chemical Company, Texas.
Japanese Office Action dated Mar. 22, 2016; from Japanese counterpart Application No. 2015-061840.
Japanese Office Action dated Nov. 1, 2016; from counterpart Japanese Application No. 2015-061840.

*Primary Examiner* — Jeremy R Pierce

(57) ABSTRACT

The instant invention is a coating composition, a coated article, and method forming such coated articles. The coating composition comprises (a) a dispersion; and (b) a crosslinker. The dispersion comprises at least one or more base polymers selected from the group consisting of an ethylene-based thermoplastic polymer, a propylene-based thermoplastic polymer, and mixtures thereof; at least one or more stabilizing agents; and a fluid medium. The crosslinker may, for example, be zinc ammonium carbonate. A coated article comprises a substrate comprising cellulosic materials; and at least one or more coating layers present on at least one or more surfaces of the substrate. The one or more coating layers may be derived from a coating composition comprising (a) a dispersion; and (b) a crosslinker. The dispersion comprises at least one or more base polymers selected from the group consisting of an ethylene-based thermoplastic polymer, a propylene-based thermoplastic polymer, and mixtures thereof; at least one or more stabilizing agents; and a fluid medium. The method of forming a coated article comprises the steps of (1) selecting a substrate comprising cellulosic materials; (2) selecting a coating composition comprising (a) a dispersion comprising at least one or more base polymers selected from the group consisting of an ethylene-based thermoplastic polymer, a propylene-based thermoplastic polymer, and mixtures thereof; at least one or more stabilizing agents; and a fluid medium; and (b) a crosslinker; (3) applying said coating composition to at least one or more surfaces of said substrate; (4) removing a at least a portion of the water; and (5) thereby forming said coated article.

1 Claim, No Drawings

(56) References Cited

U.S. PATENT DOCUMENTS

| | | | |
|---|---|---|---|
| 4,988,781 A | | 1/1991 | McKinney et al. |
| 5,272,236 A | | 12/1993 | Lai et al. |
| 5,278,272 A | | 1/1994 | Lai et al. |
| 5,385,951 A | * | 1/1995 | Soderberg ............... 521/98 |
| 5,504,172 A | | 4/1996 | Imuta et al. |
| 5,595,628 A | | 1/1997 | Gordon et al. |
| 5,677,383 A | | 10/1997 | Chum et al. |
| 5,756,659 A | | 5/1998 | Hughes et al. |
| 5,844,045 A | | 12/1998 | Kolthammer et al. |
| 5,869,575 A | | 2/1999 | Kolthammer et al. |
| 5,938,437 A | | 8/1999 | DeVincenzo |
| 6,111,023 A | | 8/2000 | Chum et al. |
| 6,294,013 B1 | * | 9/2001 | Ortlano ............ C09B 67/0063 106/402 |
| 6,316,549 B1 | | 11/2001 | Chum et al. |
| 6,423,183 B1 | | 7/2002 | Goulet et al. |
| 6,448,341 B1 | | 9/2002 | Kolthammer et al. |
| 6,455,636 B2 | | 9/2002 | Sanada et al. |
| 6,538,070 B1 | | 3/2003 | Cardwell et al. |
| 6,566,446 B1 | | 5/2003 | Parikh et al. |
| 6,897,168 B2 | | 5/2005 | Branham et al. |
| 6,949,167 B2 | | 9/2005 | Shannon et al. |
| 7,432,322 B2 | * | 10/2008 | Hood ................ B41M 5/5245 524/502 |
| 8,029,646 B2 | * | 10/2011 | Moncla ............... D06M 15/227 162/157.6 |
| 2004/0009294 A1 | * | 1/2004 | Kuribayashi et al. ........ 427/212 |
| 2004/0091645 A1 | * | 5/2004 | Heederik ............... B41M 5/52 428/32.1 |
| 2005/0100754 A1 | | 5/2005 | Moncla et al. |
| 2005/0192365 A1 | | 9/2005 | Strandburg et al. |
| 2007/0249743 A1 | * | 10/2007 | Sehanobish et al. ......... 521/134 |
| 2008/0009586 A1 | * | 1/2008 | VanSumeren et al. ......... 525/88 |
| 2008/0176968 A1 | * | 7/2008 | VanSumeren et al. ......... 521/97 |
| 2008/0295985 A1 | * | 12/2008 | Moncla ............... D06M 15/227 162/157.6 |
| 2009/0253015 A1 | * | 10/2009 | Onodera et al. ............... 429/33 |

FOREIGN PATENT DOCUMENTS

| | | | |
|---|---|---|---|
| WO | WO-00/01745 A1 | 1/2000 | |
| WO | WO2007/078537 | 7/2000 | |
| WO | WO-2001/12414 A1 | 2/2001 | |
| WO | WO-01/49937 A1 | 7/2001 | |
| WO | WO-02/062894 A1 | 8/2002 | |
| WO | WO-2005/021622 A2 | 3/2005 | |
| WO | WO-2005/021638 A2 | 3/2005 | |
| WO | WO 2005/090427 | 9/2005 | |
| WO | WO-2007/078537 A1 | 7/2007 | |
| WO | WO 2007078537 A1 * | 7/2007 | .......... D06M 15/227 |
| WO | WO 2007140009 A2 * | 12/2007 | ............ D21H 19/44 |
| WO | WO-2008/036942 A2 | 3/2008 | |

\* cited by examiner

COATING COMPOSITION, A COATED ARTICLE, AND METHOD OF FORMING SUCH ARTICLES

CROSS-REFERENCE TO RELATED APPLICATIONS

This application is a non-provisional application claiming priority from the U.S. Provisional Patent Application No. 60/988,222, filed on Nov. 15, 2007, entitled "COATING COMPOSITION, A COATED ARTICLE, AND METHOD OF FORMING SUCH ARTICLES," the teachings of which are incorporated by reference herein, as if reproduced in full hereinbelow.

FIELD OF INVENTION

The instant invention relates to a coating composition, a coated article, and method forming such coated articles.

BACKGROUND OF THE INVENTION

The use of polymeric materials as coating compositions for paper products is generally known. Such polymeric coating compositions, for example, may provide a barrier against grease, oil, water and/or vapor. Alternatively, such polymeric coating compositions may provide improved structural integrity and strength. The use of such polymeric coating compositions may however generate other problems such as blocking. Blocking, as used herein, refers to the tendency of two or more adjacent layers of one or more sheets to stick together.

It is, therefore, highly desirable for the coated paper articles to possess improved non-blocking properties. Despite the efforts to produce coated paper articles having improved non-blocking properties, there is still, however, a need for a coating composition that provides improved non-blocking properties. Furthermore, there is still a need for coated paper articles having improved non-blocking properties, and method of making the same.

SUMMARY OF THE INVENTION

The instant invention is a coating composition, a coated article, and method forming such coated articles. The coating composition comprises (a) a dispersion; and (b) a crosslinker. The dispersion comprises at least one or more base polymers selected from the group consisting of an ethylene-based thermoplastic polymer, a propylene-based thermoplastic polymer, and mixtures thereof; at least one or more stabilizing agents; and a fluid medium. The crosslinker may, for example, be zinc ammonium carbonate. A coated article comprises a substrate comprising cellulosic materials; and at least one or more coating layers present on at least one or more surfaces of the substrate. The one or more coating layers may be derived from a coating composition comprising (a) a dispersion; and (b) a crosslinker. The dispersion comprises at least one or more base polymers selected from the group consisting of an ethylene-based thermoplastic polymer, a propylene-based thermoplastic polymer, and mixtures thereof; at least one or more stabilizing agents; and a fluid medium. The method of forming a coated article comprises the steps of (1) selecting a substrate comprising cellulosic materials; (2) selecting a coating composition comprising (a) a dispersion comprising at least one or more base polymers selected from the group consisting of an ethylene-based thermoplastic polymer, a propylene-based thermoplastic polymer, and mixtures thereof; at least one or more stabilizing agents; and a fluid medium; and (b) a crosslinker; (3) applying said coating composition to at least one or more surfaces of said substrate; (4) removing a at least a portion of the water; and (5) thereby forming said coated article.

In one embodiment, the instant invention provides a coating composition comprising (a) a dispersion comprising at least one or more base polymers selected from the group consisting of an ethylene-based thermoplastic polymer, a propylene-based thermoplastic polymer, and mixtures thereof; at least one or more stabilizing agents; and a fluid medium; and (b) a crosslinker.

In an alternative embodiment, the instant invention further provides a coated article comprising (1) a substrate comprising cellulosic materials; and (2) at least one or more coating layers present on at least one or more surfaces of said substrate, wherein said coating is derived from a coating composition comprising (a) a dispersion comprising at least one or more base polymers selected from the group consisting of an ethylene-based thermoplastic polymer, a propylene-based thermoplastic polymer, and mixtures thereof; at least one or more stabilizing agents; and a fluid medium; and (b) a crosslinker.

In an alternative embodiment, the instant invention further provides a coated article comprising the coating application product of (1) a substrate comprising cellulosic materials; and (2) a coating composition present on at least one or more surfaces of said cellulosic substrate, wherein said coating composition comprises (a) a dispersion comprising at least one or more base polymers selected from the group consisting of an ethylene-based thermoplastic polymer, a propylene-based thermoplastic polymer, and mixtures thereof; at least one or more stabilizing agents; and a fluid medium; and (b) a crosslinker.

In an alternative embodiment, the instant invention further provides a method of forming a coated article comprising the steps of (1) selecting a substrate comprising cellulosic materials; (2) selecting a coating composition comprising (a) a dispersion comprising at least one or more base polymers selected from the group consisting of an ethylene-based thermoplastic polymer, a propylene-based thermoplastic polymer, and mixtures thereof; at least one or more stabilizing agents; and a fluid medium; and a crosslinker; (3) applying said coating composition to at least one or more surfaces of said substrate; (4) removing a at least a portion of the water; and (5) thereby forming said coated article.

In an alternative embodiment, the instant invention further provides a method of forming a coated article comprising the steps of (1) selecting one or more cellulosic fibers; (2) selecting a coating composition comprising (a) a dispersion comprising at least one or more base polymers selected from the group consisting of an ethylene-based thermoplastic polymer, a propylene-based thermoplastic polymer, and mixtures thereof; at least one or more stabilizing agents; and a fluid medium; and a crosslinker; (3) incorporating said coating composition onto said one or more cellulosic fibers; (4) forming said one or more cellulosic fibers incorporating said coating composition into a web; (5) removing at least a portion of the water; and (6) thereby forming said coated cellulosic article.

In an alternative embodiment, the instant invention provides a coating composition, a coated article, and method of forming the same, in accordance with any of the preceding embodiments, except that the crosslinker is zinc ammonium carbonate.

In an alternative embodiment, the instant invention provides a coating composition, a coated article, and method of forming the same, in accordance with any of the preceding embodiments, except that the coating composition further comprises a solution acrylic polymer, an emulsion polymer latex, or combinations thereof.

In an alternative embodiment, the instant invention provides a coating composition, a coated article, and method of forming the same, in accordance with any of the preceding embodiments, except that the ethylene-based thermoplastic polymer is an alpha-olefin interpolymer of ethylene and at least one or more comonomers selected from the group consisting of propylene, a $C_4$ to $C_{20}$ linear, branched or cyclic diene, vinyl acetate, and a compound represented by the formula $H_2C=CHR$, wherein R is a $C_1$ to $C_{20}$ linear, branched or cyclic alkyl or a $C_6$ to $C_{20}$ aryl group.

In an alternative embodiment, the instant invention provides a coating composition, a coated product, and method of forming the same, in accordance with any of the preceding embodiments, except that the propylene-based thermoplastic polymer is an alpha-olefin interpolymer of propylene and at least one or more comonomers selected from the group consisting of ethylene, a $C_4$ to $C_{20}$ linear, branched or cyclic diene, and a compound represented by the formula $H_2C=CHR$, wherein R is a $C_1$ to $C_{20}$ linear, branched or cyclic alkyl group or a $C_6$ to $C_{20}$ aryl group.

In an alternative embodiment, the instant invention provides a coating composition, a coated product, and method of forming the same, in accordance with any of the preceding embodiments, except that the dispersion comprises from 25 to 74 percent by the combined volume of the at least one or more base polymers and the at least one or more stabilizing agents based on the total volume of the dispersion.

In an alternative embodiment, the instant invention provides a coating composition, a coated article, and method of forming the same, in accordance with any of the preceding embodiments, except that the coating composition comprises less than 10 percent by weight of said solution acrylic polymer based on the weight of said coating composition.

In an alternative embodiment, the instant invention provides a coating composition, a coated article, and method of forming the same, in accordance with any of the preceding embodiments, except that the coating composition comprises less than 50 percent by weight of said emulsion polymer latex based on the weight of said coating composition.

In an alternative embodiment, the instant invention provides a coating composition, a coated article, and method of forming the same, in accordance with any of the preceding embodiments, except that the coating composition comprises 2 to 10 percent by weight of said zinc ammonium carbonate.

In an alternative embodiment, the instant invention provides a coating composition, a coated article, and method of forming the same, in accordance with any of the preceding embodiments, except that the coating composition comprises 2 to 7 percent by weight of said zinc ammonium carbonate.

In an alternative embodiment, the instant invention provides a coating composition, a coated article, and method of forming the same, in accordance with any of the preceding embodiments, except that the coating composition comprises at least 50 percent by weight of said dispersion based on the total weight of said coating composition.

In an alternative embodiment, the instant invention provides a coating composition, a coated article, and method of forming the same, in accordance with any of the preceding embodiments, except that the coating composition comprises 2 to 10 percent by weight of said solution acrylic polymer based on the weight of said coating composition.

In an alternative embodiment, the instant invention provides a coating composition, a coated article, and method of forming the same, in accordance with any of the preceding embodiments, except that the coating composition comprises 10 to 50 percent by weight of said emulsion polymer latex based on the weight of said coating composition.

In an alternative embodiment, the instant invention provides a coating composition, a coated article, and method of forming the same, in accordance with any of the preceding embodiments, except that the stabilizing agent comprises a partially or fully neutralized ethylene-acid copolymer.

In an alternative embodiment, the instant invention provides a coating composition, a coated article, and method of forming the same, in accordance with any of the preceding embodiments, except that the at least a portion of the fluid media is removed at a temperature in the range of less than the melting point temperature of the base polymer selected from the group consisting of an ethylene-based thermoplastic polymer, a propylene-based thermoplastic polymer, and mixtures thereof.

In an alternative embodiment, the instant invention provides a coating composition, a coated article, and method of forming the same, in accordance with any of the preceding embodiments, except that the wherein at least a portion of the fluid media is removed at a temperature in the range of greater than or equal to the melting point temperature of the base polymer selected from the group consisting of an ethylene-based thermoplastic polymer, a propylene-based thermoplastic polymer, and mixtures thereof.

In an alternative embodiment, the instant invention provides a coated article, and method of forming the same, in accordance with any of the preceding embodiments, except that the coating composition is applied topically onto at least one or more surfaces of the substrate via coating, spraying, extruding, impregnating, or padding.

In an alternative embodiment, the instant invention provides a coated article, and method of forming the same, in accordance with any of the preceding embodiments, except that the coated article comprises 1 g to 50 g by weight of the coating composition per meter square of the substrate.

In an alternative embodiment, the instant invention provides a coated article, and method of forming the same, in accordance with any of the preceding embodiments, except that the coated article comprises 1 g to 40 g by weight of the coating composition per meter square of the substrate.

In an alternative embodiment, the instant invention provides a coated article, and method of forming the same, in accordance with any of the preceding embodiments, except that the coated article comprises 1 g to 30 g by weight of the coating composition per meter square of the substrate.

In an alternative embodiment, the instant invention provides a coated article, and method of forming the same, in accordance with any of the preceding embodiments, except that the coated article comprises 1 g to 20 g by weight of the coating composition per meter square of the substrate.

In an alternative embodiment, the instant invention provides a coated article, and method of forming the same, in accordance with any of the preceding embodiments, except that the coated article comprises 1 g to 15 g by weight of the coating composition per meter square of the substrate.

In an alternative embodiment, the instant invention provides a coating composition, a coated article, and method of forming the same, in accordance with any of the preceding embodiments, except that the substrate comprises at least one or more fibers selected from the group consisting of natural cellulosic fibers, synthetic cellulosic fibers, and mixtures thereof.

In an alternative embodiment, the instant invention provides a coating composition, a coated article, and method of forming the same, in accordance with any of the preceding embodiments, except that the cellulosic substrate comprises at least one selected from the group consisting of natural cellulosic fibers, synthetic cellulosic fibers, and mixtures thereof.

In an alternative embodiment, the instant invention provides a coating composition, a coated article, and method of forming the same, in accordance with any of the preceding embodiments, except that the coated article is a paper sheet, paper-board, corrugated box, wall paper, or photographic grade paper.

DETAILED DESCRIPTION OF THE INVENTION

The instant invention is a coating composition, a coated article, and method forming such coated articles. The coating composition comprises (a) a dispersion; and (b) a crosslinker. The dispersion comprises at least one or more base polymers selected from the group consisting of an ethylene-based thermoplastic polymer, a propylene-based thermoplastic polymer, and mixtures thereof; at least one or more stabilizing agents; and a fluid medium. The coating composition may further comprise a solution acrylic polymer, an emulsion polymer latex, or combinations thereof. A coated product comprises a substrate comprising cellulosic materials; and at least one or more coating layers present on at least one or more surfaces of the substrate. The one or more coating layers are derived from a coating composition comprising (a) a dispersion; and (b) a crosslinker. The dispersion comprises at least one or more base polymers selected from the group consisting of an ethylene-based thermoplastic polymer, a propylene-based thermoplastic polymer, and mixtures thereof; at least one or more stabilizing agents; and a fluid medium. The method of forming a coated article comprises the steps of (1) selecting a substrate comprising cellulosic materials; (2) selecting a coating composition comprising (a) a dispersion comprising at least one or more base polymers selected from the group consisting of an ethylene-based thermoplastic polymer, a propylene-based thermoplastic polymer, and mixtures thereof; at least one or more stabilizing agents; and a fluid medium; and (b) a crosslinker; (3) applying said coating composition to at least one or more surfaces of said substrate; (4) removing a at least a portion of the water; and (5) thereby forming the coated article.

Coating Composition

The coating composition comprises (a) a dispersion; and (b) a crosslinker. The coating composition may further include a crosslinker. The coating composition may further comprise a solution acrylic polymer, an emulsion polymer latex, or combinations thereof.

The coating composition may comprise at least 20 percent by weight of the dispersion, based on the weight of the coating composition. All individual values and subranges from at least 20 weight percent are included herein and disclosed herein; for example, the coating composition may comprise at least 30 percent by weight of the dispersion, based on the weight of the coating composition; or in the alternative, the coating composition may comprise at least 40 percent by weight of the dispersion, based on the weight of the coating composition; or in the alternative, the coating composition may comprise at least 50 percent by weight of the dispersion, based on the weight of the coating composition; or in the alternative, the coating composition may comprise at least 55 percent by weight of the dispersion, based on the weight of the coating composition; or in the alternative, the coating composition may comprise at least 65 percent by weight of the dispersion, based on the weight of the coating composition; or in the alternative, the coating composition may comprise at least 75 percent by weight of the dispersion, based on the weight of the coating composition.

The coating composition may comprise about less than 20 percent by weight of the crosslinker, based on the weight of the coating composition. All individual values and subranges from about less than 20 weight percent are included herein and disclosed herein; for example, the coating composition may comprise from 1 to 15 percent by weight of the crosslinker, based on the weight of the coating composition; or in the alternative, the coating composition may comprise from 2 to 10 percent by weight of the crosslinker, based on the weight of the coating composition; or in the alternative, the coating composition may comprise from 2 to 7 percent by weight of the crosslinker, based on the weight of the coating composition; or in the alternative, the coating composition may comprise from 3 to 7 percent by weight of the crosslinker, based on the weight of the coating composition.

The coating composition may further comprise about less than 80 percent by weight of the solution acrylic polymer, based on the weight of the coating composition. All individual values and subranges from about less than 80 weight percent are included herein and disclosed herein; for example, the coating composition may comprise from 2 to 50 percent by weight of the solution acrylic polymer, based on the weight of the coating composition; or in the alternative, the coating composition may comprise from 2 to 30 percent by weight of the solution acrylic polymer, based on the weight of the coating composition; or in the alternative, the coating composition may comprise from 2 to 20 percent by weight of the solution acrylic polymer, based on the weight of the coating composition; or in the alternative, the coating composition may comprise less than 10 percent by weight of the solution acrylic polymer, based on the weight of the coating composition; or in the alternative, the coating composition may comprise from 2 to 10 percent by weight of the solution acrylic polymer, based on the weight of the coating composition; or in the alternative, the coating composition may comprise from 2 to 7 percent by weight of the solution acrylic polymer, based on the weight of the coating composition.

The coating composition may further comprise about less than 50 percent by weight of the emulsion polymer latex, based on the weight of the coating composition. All individual values and subranges from about less than 80 weight percent are included herein and disclosed herein; for example, the coating composition may comprise from 10 to 50 percent by weight of the emulsion polymer latex, based on the weight of the coating composition; or in the alternative, the coating composition may comprise from 20 to 40 percent by weight of the emulsion polymer latex, based on the weight of the coating composition.

Dispersion

The coating composition comprises a dispersion. The dispersion comprises at least one or more base polymers selected from the group consisting of an ethylene-based thermoplastic polymer, a propylene-based thermoplastic polymer, and mixtures thereof; at least one or more stabilizing agents; and a fluid medium. The dispersion may further include one or more fillers and/or one or more additives. The dispersion may preferably be an aqueous dispersion.

Base Polymer

The dispersion comprises at least one or more base polymers. The base polymer may, for example, be a polymer selected from the group consisting of ethylene-based polymers, and propylene-based polymers.

In selected embodiments, the base polymer is formed from ethylene-alpha olefin copolymers or propylene-alpha olefin copolymers. In particular, in preferred embodiments, the base polymer comprises one or more non-polar polyolefins.

In other selected embodiments, olefin block copolymers, e.g., ethylene multi-block copolymer, such as those described in the International Publication No. WO2005/090427 and U.S. patent application Ser. No. 11/376,835 may be used as the base polymer. Such olefin block copolymer may be an ethylene/α-olefin interpolymer:

(a) having a $M_w/M_n$ from 1.7 to 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from 1.7 to 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of 1:1 to 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In alternative embodiments, polyolefins such as polypropylene, polyethylene, and copolymers thereof, and blends thereof, as well as ethylene-propylene-diene terpolymers, may be used as the base polymer. In some embodiments, exemplary olefinic polymers include, but are not limited to, homogeneous polymers described in U.S. Pat. No. 3,645,992 issued to Elston; high density polyethylene (HDPE) as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

Polymer compositions described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, may be also used as the base polymer. Of course, blends of polymers can be used as well. In some embodiments, the blends include two different Ziegler-Natta polymers. In other embodiments, the blends can include blends of a Ziegler-Natta and a metallocene polymer. In still other embodiments, the polymer used herein is a blend of two different metallocene polymers. In other embodiments polymers produced from single site catalysts may be used. In yet another embodiment, block or multi-block copolymers may be used in embodiments of the invention. Such polymers include those described and claimed in WO2005/090427 (having priority to U.S. Ser. No. 60/553,906, filed Mar. 7, 2004).

In some particular embodiments, the base polymer is a propylene-based copolymer or interpolymer. In some embodiments, the propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra.

In other particular embodiments, the base polymer may be ethylene vinyl acetate (EVA) based polymers. In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In certain embodiments, the base polymer can be an ethylene-octene copolymer or interpolymer having a density between 0.863 and 0.911 g/cc and melt index (190° C. with 2.16 kg weight) from 0.1 to 100 g/10 min. In other embodiments, the ethylene-octene copolymers may have a density between 0.863 and 0.902 g/cm$^3$ and melt index (measured at 190° C. under a load of 2.16 kg) from 0.8 to 35 g/10 min.

In certain embodiments, the base polymer can be a propylene-ethylene copolymer or interpolymer having an ethylene content between 5 and 20 percent by weight and a melt flow rate (measured at 230° C. under a load of 2.16 kg) from 0.5 to 300 g/10 min. In other embodiments, the propylene-ethylene copolymer or interpolymer may have an ethylene content between 9 and 12 percent by weight and a melt flow rate (measured at 230° C. under a load of 2.16 kg) from 1 to 100 g/10 min.

In certain other embodiments, the base polymer can be a low density polyethylene having a density between 0.911 and 0.925 g/cm$^3$ and melt index (measured at 190° C. under a load of 2.16 kg) from 0.1 to 100 g/10 min.

In other embodiments, the base polymer can have a crystallinity of less than 50 percent. For example, the crystallinity of the base polymer may be from 5 to 35 percent; or in the alternative, the crystallinity can range from 7 to 20 percent.

In certain other embodiments, the base polymer can have a melting point of less than 110° C. For example, the melting point may be from 25 to 100° C.; or in the alternative, the melting point may be between 40 and 85° C.

In certain embodiments, the base polymer can have a weight average molecular weight greater than 20,000 g/mole. For example, the weight average molecular weight may be from 20,000 to 150,000 g/mole; or in the alternative, from 50,000 to 100,000 g/mole.

The one or more base polymers, e.g., thermoplastic resins, may be contained within the aqueous dispersion in an amount from 1 percent by weight to 96 percent by weight. For instance, the one or more base polymers, e.g., thermoplastic resins, may be present in the aqueous dispersion in an amount from 10 percent by weight to 70 percent by weight, such as from 20 percent to 50 percent by weight.

Those having ordinary skill in the art will recognize that the above list is a non-comprehensive listing of exemplary base polymers. It will be appreciated that the scope of the present invention is restricted by the claims only.

Stabilizing Agent

The dispersion may further comprise at least one or more stabilizing agents, also referred to herein as dispersion agents, to promote the formation of a stable dispersion or emulsion. In selected embodiments, the stabilizing agent may be a surfactant, a polymer (different from the base polymer detailed above), or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids or fatty acid salts having from 12 to 60 carbon atoms. In other embodiments, the long chain fatty acid or fatty acid salt may have from 12 to 40 carbon atoms.

If the polar group of the polymer is acidic or basic in nature, the polymeric stabilizing agent may be partially or fully neutralized with a neutralizing agent to form the corresponding salt. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be any amine such as monoethanolamine, or 2-amino-2-methyl-1-propanol (AMP). Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or a non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts.

In certain embodiments, the dispersing agent or stabilizing agent may be used in an amount ranging from greater than zero to 60 percent by weight based on the amount of base polymer (or base polymer mixture) used. For example, long chain fatty acids or salts thereof may be used from 0.5 to 10 percent by weight based on the amount of base polymer. In other embodiments, ethylene-acrylic acid or ethylene-methacrylic acid copolymers may be used in an amount from 0.01 to 60 percent by weight based on the weight of the base polymer; or in the alternative, ethylene-acrylic acid or ethylene-methacrylic acid copolymers may be used in an amount from 0.5 to 60 percent by weight based on the weight of the base polymer. In yet other embodiments, sulfonic acid salts may be used in an amount from 0.01 to 60 percent by weight based on the weight of the base polymer; or in the alternative, sulfonic acid salts may be used in an amount from 0.5 to 10% by weight based on the weight of the base polymer.

The type and amount of stabilizing agent used can also affect end properties of the cellulose-based article formed incorporating the dispersion. For example, articles having improved oil and grease resistance might incorporate a surfactant package having ethylene-acrylic acid copolymers or ethylene-methacrylic acid copolymers in an amount from 10 to 50 percent by weight based on the total amount of base polymer. A similar surfactant package may be used when improved strength or softness is a desired end property. As another example, articles having improved water or moisture resistance might incorporate a surfactant package utilizing long chain fatty acids in an amount from 0.5 to 5 percent, or ethylene-acrylic acid copolymers in an amount from 10 to 50 percent, both by weight based on the total amount of base polymer. In other embodiments, the minimum amount of surfactant or stabilizing agent must be at least 1 percent by weight based on the total amount of base polymer.

Fluid Medium

The dispersion further comprises a fluid medium. The fluid medium may be any medium; for example, the fluid medium may be water. Water content of the dispersion may preferably be controlled so that the solids content (base polymer plus stabilizing agent) is between 1 percent to 74 percent by volume. In particular embodiments, the solids range may be between 10 percent to 70 percent by volume. In other particular embodiments, the solids range is between 20 percent to 60 percent by volume. In certain other embodiments, the solids range is between 30 percent to 55 percent by volume.

Fillers for the Dispersion

The dispersion may further comprise one or more fillers. The dispersion comprises from 0.01 to 600 parts by weight of one or more fillers per hundred parts by the combined weight of the base polymer, e.g., polyolefin, and the stabilizing agent. In certain embodiments, the filler loading in the dispersion can be from 0.01 to 200 parts by the weight of one or more fillers per hundred parts of the combined weight of the base polymer, e.g., polyolefin, and the stabilizing agent. The filler material can include conventional fillers such as milled glass, calcium carbonate, aluminum trihydrate, talc, antimony trioxide, fly ash, clays (such as bentonite or kaolin clays for example), or other known fillers.

Additives for the Dispersion

The dispersion may further include additives. Such additives may be used with the base polymer, stabilizing agent, or filler used in the dispersion without deviating from the scope of the present invention. For example, additives may include, but are not limited to, a wetting agent, surfactants, anti-static agents, antifoam agent, anti block, wax-dispersion pigments, a neutralizing agent, a thickener, a compatibilizer, a brightener, a rheology modifier, a biocide, a fungicide, and other additives known to those skilled in the art.

Dispersion Formulations

Exemplary dispersion formulations may include a base polymer, which may comprise at least one non-polar polyolefin, a stabilizing agent, which may comprise at least one polar polyolefin, water, and optionally one or more fillers and or additives. With respect to the base polymer and the stabilizing agent, in certain embodiments, the at least one non-polar polyolefin may comprise between 30 percent to 99 percent by weight based on the total amount of base polymer and stabilizing agent in the dispersion; or in the alternative, the at least one non-polar polyolefin comprises between 50 percent and 80 percent by weight based on the total amount of base polymer and stabilizing agent in the dispersion; or in anther alternative, the one or more non-polar polyolefins comprise about 70 percent by weight based on the total amount of base polymer and stabilizing agent in the dispersion.

With respect to the filler, typically, an amount greater than 0 to 600 parts per hundred parts of a combined amount of the base polymer, e.g., polyolefin, and the stabilizing agent. In selected embodiments, between 50 to 250 parts per hundred parts of a combined amount of the base polymer, e.g., polyolefin, and the stabilizing agent. In selected embodiments, between 10 to 500 parts per hundred parts of a combined amount of the base polymer, e.g., polyolefin, and the stabilizing agent. In still other embodiments, from between 20 to 400 parts per hundred parts of a combined amount of the base polymer, e.g., polyolefin, and the stabilizing agent. In other embodiments, from 0 to 200 parts per hundred parts of a combined amount of the base polymer, e.g., polyolefin, and the stabilizing agent.

These solid materials, i.e. base polymer and stabilizing agents, are preferably dispersed in a liquid medium, which in certain embodiments is water. In certain embodiments, sufficient neutralization agent is added to maintain a pH in the range of 4 to 14. In certain other embodiments, sufficient base is added to maintain a pH in the range 6 to 11; in certain other embodiments, the pH may be in the range of 8 to 10.5. Water content of the dispersion is preferably controlled so that the solids content (base polymer plus stabilizing agent) is between 1 percent to 74 percent by volume. In another embodiment, the solid content is between 25 percent to 74 percent by volume. In particular embodiments, the solids range may be between 10 percent to 70 percent by weight. In other particular embodiments, the solids range is between 20 percent to 60 percent by weight. In certain other embodiments, the solids range is between 30 percent to 55 percent by weight.

In certain embodiments, a cellulosic-based substrate and a coating composition on at least one surface of the cellulosic-based substrate may have a combined amount of the at least one or more base polymer and the at least one or more stabilizing agents in the range of 10 to 150 parts per hundred parts by weight of the cellulosic-based substrate. In other embodiments, a cellulosic substrate and a coating composition on at least one surface of the cellulosic structure may have a combined amount of the filler, in the range of 10 to 600 parts per hundred parts by weight of the cellulosic substrate, or in the alternative, from 10 to 300 parts in other embodiments.

The aqueous dispersions may be characterized in having an average particle size of between 0.01 to 5.0 microns, or in the alternative from 0.1 to 5.0 microns. In other embodiments, the aqueous dispersion may have an average particle size of from 0.5 μm to 2.7 μm. In other embodiments, from 0.8 μm to 1.2 μm. The phrase "average particle size," as used herein refers to the volume-mean particle size. In order to measure the particle size, laser-diffraction techniques may, for example, be employed. A particle size in this description refers to the diameter of the polymer in the dispersion. For polymer particles that are not spherical, the diameter of the particle is the average of the long and short axes of the particle. Particle sizes can be measured on a Beckman-Coulter LS230 laser-diffraction particle size analyzer or other suitable device.

The aqueous dispersion may further include surfactants, frothing agents, dispersants, thickeners, fire retardants, pigments, antistatic agents, reinforcing fibers, antifoam agent, anti block, wax-dispersion, antioxidants, a neutralizing agent, a rheology modifier, preservatives, biocides, acid scavengers, a wetting agent, and the like. While optional for purposes of the present invention, other components can be highly advantageous for product stability during and after the manufacturing process.

In addition, the aqueous dispersion may further optionally include a filler wetting agent. A filler wetting agent generally may help make the filler and the polyolefin dispersion more compatible. Useful wetting agents include phosphate salts, such as sodium hexametaphosphate. A filler wetting agent can be included in the aqueous dispersion at a concentration of at least about 0.5 parts per 100 parts of filler, by weight.

Furthermore, the aqueous dispersion may further optionally include a thickener. Thickeners can be useful in the present invention to increase the viscosity of low viscosity dispersions. Thickeners suitable for use in the practice of the present invention can be any known in the art such as for instance poly-acrylate type or associate non ionic thickeners such as modified cellulose ethers. For example, suitable thickeners include ALCOGUM™ VEP-II (trademark of Alco Chemical Corporation), RHEOVIS™ and VISCALEX™ (trademarks of Ciba Ceigy), UCAR® Thickener 146, or ETHOCEL™ or METHOCEL™ (trademarks of the The Dow Chemical Company) and PARAGUM™ 241 (trademarks of Para-Chem Southern, Inc.), or BERMACOL™ (trademark of Akzo Nobel) or AQUALON™ (trademark of Hercules) or ACUSOL® (trademark of Rohm and Haas). Thickeners can be used in any amount necessary to prepare a dispersion of desired viscosity.

The ultimate viscosity of the dispersion is, therefore, controllable. Addition of the thickener to the dispersion including the amount of filler can be done with conventional means to result in viscosities as needed. Viscosities of thus dispersions can reach +3000 cP (Brookfield spindle 4 with 20 rpm) with moderate thickener dosing (up to 4% preferably, below 3% based on 100 phr of aqueous polymer dispersion). The starting polymer dispersion as described has an initial viscosity prior to formulation with fillers and additives between 20 and 1000 cP (Brookfield viscosity measured at room temperature with spindle RV3 at 50 rpm). Still more preferably, the starting viscosity of the dispersion may be between 100 to 600 cP.

Also, aqueous dispersions used herein are characterized by their stability when a filler is added to the base polymer/stabilizing agent. In this context, stability refers to the stability of viscosity of the resultant aqueous polyolefin dispersion. In order to test the stability, the viscosity is measured over a period of time. Preferably, viscosity measured at 20° C. should remain +/−10% of the original viscosity over a period of 24 hours, when stored at ambient temperature.

The aqueous dispersion of the present invention may contain particles having an average particle size of from 0.01 to 5 microns, for example, 0.1 to 5 microns.

Exemplary aqueous dispersions are disclosed, for instance, in U.S. Patent Application Publication No. 2005/0100754, U.S. Patent Application Publication No. 2005/0192365, PCT Publication No. WO 2005/021638, and PCT Publication No. WO 2005/021622, which are all incorporated herein by reference.

Forming the Dispersion

The aqueous dispersion can be formed by any number of methods recognized by those having skill in the art. In certain embodiments, the aqueous dispersion may be formed by using techniques disclosed for example, in the dispersions were formed in accordance with the procedures as described in WO2005021638, which is incorporated by reference in its entirety.

In a specific embodiment, a base polymer, a stabilizing agent, and optionally a filler are melt-kneaded in an extruder along with water and a neutralizing agent, such as ammonia, potassium hydroxide, or a combination of the two to form a dispersion compound. Those having ordinary skill in the art will recognize that a number of other neutralizing agents may be used. In some embodiments, the filler may be added after blending the base polymer and stabilizing agent. In some embodiments, the dispersion is first diluted to contain 1 to 3% by weight water and then, subsequently, further diluted to comprise greater than about 25% by weight water.

Any melt-kneading means known in the art may be used. In some embodiments, a kneader, a BANBURY® mixer, single-screw extruder, or a multi-screw extruder is used. A process for producing the dispersions in accordance with the present invention is not particularly limited. One exemplary process is a process comprising melt-kneading the above-mentioned components according to U.S. Pat. Nos. 5,756,659 and 6,455,636.

For example, an extruder, in certain embodiments a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

Resin, in the form of pellets, powder, or flakes, is fed from the feeder to an inlet of the extruder where the resin is melted or compounded. In some embodiments, the dispersing agent is added to the resin through and along with the resin and in other embodiments, the dispersing agent is provided separately to the twin screw extruder. The resin melt is then delivered from the mix and convey zone to an emulsification zone of the extruder where the initial amount of water and base from the water and base reservoirs are added through an inlet. In some embodiments, dispersing agent may be added additionally or exclusively to the water stream. In some embodiments, the emulsified mixture is further diluted with additional water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated.

In particular embodiments, it may be desired to utilize the aqueous dispersion in the form of foam. When preparing foams, it is often preferred to froth the aqueous dispersion. Preferred in the practice of this invention is the use of a gas as a frothing agent. Examples of suitable frothing agents include, but are not limited to, gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed aqueous dispersion, it is preferred to mix all components and then blend the air or gas into the mixture, using equipment such as an OAKES, MONDO, or FIRESTONE frother.

Surfactants useful for preparing a stable froth are referred to herein as foam stabilizers. Foam stabilizers are useful in the practice of the present invention. Those having ordinary skill in this field will recognize that a number of foam stabilizers may be used. Foam stabilizers can include, for example, sulfates, succinamates, and sulfosuccinamates.

Crosslinker

The coating composition further comprises a crosslinker. Such crosslinkers include, but are not limited to, metal salts. Crosslinking occurs by merely removal of the water during drying of the coating composition of the invention. Suitable crosslinking agents include, but are not limited to, multivalent metal compounds, such as chromic nitrate, zinc acetate, zinc sulfate, zinc oxide and the like. Exemplary crosslinkers include, but are not limited to, ZAC (Zinc Ammonium Carbonate), KZC (Potassium Zirconum Carbonate) and AZC (Ammonium Zirconum Carbonate). Metal cross-linking agents may also be used. Exemplary polyvalent metals include, but are not limited to, zirconium, titanium, hafnium, chromium, zinc, aluminum, or a mixture of any two or more thereof. Zirconium is especially well suited as a metal cross-linking agent. The metal cross-linking agent is typically a salt or complex of ammonia, acetate, propionate, sulfate, carbonate, nitrate, phosphate, tartrate, acetylacetonate, oxide, or a mixture of any two or more thereof. Thus, exemplary metal cross-linking agents include ammonium zirconium carbonate, zirconium acetylacetonate, zirconium acetate, zirconium carbonate, zirconium sulfate, zirconium phosphate, potassium zirconium carbonate, zirconium sodium phosphate, zirconium tartrate, zinc oxide, and other combinations of the above polyvalent metals and counter ions. Similarly, organic titanates such as titanium acetylacetonate and titanium lactate chelate can be used. The crosslinker may preferably be zinc ammonium carbonate.

Solution Acrylic Polymer

The coating composition may optionally comprise a solution acrylic polymer. Such solution acrylic polymers are typically water solution resins. The solution acrylic polymer may for example comprise from 2 to 15 percent by weight of the acrylic type resin based on the total weight of the formulation. Particularly preferred acrylic resins are acrylic solution resins, such as Joncryl® 60, manufactured by S. C Johnson & Son, Inc., Morcryl® 132 and 150, manufactured by Morton International, Inc.; styrenated acrylic emulsion resins, such as Joncryl® 89 and 130, manufactured by S.C. Johnson & Son, Inc., Lucidene® 602, manufactured by Morton International, Inc., and Zinpol® 460, manufactured by B.F. Goodrich. These resins are generally neutralized with ammonia to increase their aqueous solubility. A preferred acrylic solution resin is Morcryl® 132, manufactured by Morton International, Inc.

Emulsion Polymer Latex

The coating composition may optionally comprise an emulsion polymer latex. Such emulsion polymer latex may comprise at least one synthetic latex. A synthetic latex is generally known as an aqueous dispersion of polymer particles prepared by emulsion polymerization of one or more monomers. The latex can have a monomodal or polymodal, e.g. bimodal, particle size distribution. Mixtures or blends of latexes can be employed.

In one embodiment of the invention, the polymer of the latex is a copolymer, i.e. a polymer formed from at least 2 monomers. The latex may contain a single copolymer or more than one copolymer. Advantageously, the polymer of the latex has a glass transition temperature (Tg) of from −50° C. to 100° C.

The copolymers that are useful alone, as opposed to those useful only in a blend, in the practice of this invention desirably have a Tg of no lower than about −10° C., preferably at least about 0° C. Desirably, the Tg of the copolymer is no higher than about 50° C., preferably up to about 40° C. The generally preferred range is from 0° C. to 40° C. The Tg of the copolymer of the composition of this invention is determined by differential scanning calorimetry (DSC).

While a wide range of monomeric compositions are useful for the latex component of aqueous coating composition of this invention, in a particular embodiment it is preferred that the copolymer is uncrosslinked by virtue of there being no crosslinking monomers present in the group of ethylenically unsaturated monomers present in the polymerization mixture from which it is prepared. That is, it is desirable in this embodiment that the copolymer be produced by polymerization in the absence of crosslinking monomers or some other crosslinking agent.

In an alternative embodiment, it is desirable for the copolymer to be lightly crosslinked. This may be accomplished by the inclusion in the polymerization mixture from which the copolymer is prepared of a monomer that is multifunctional and of known utility as a crosslinker, such as, for example, divinyl benzene or allyl (meth)acrylate. In this particular embodiment, it is preferred that the content of crosslinking monomers in the copolymer is no more than about 2 weight percent, preferably from 0.001 to 2 weight percent, more preferably from 0.01 to 1.5 weight percent, still more preferably from 0.1 to 1 weight percent, where the weight percentages are based on the total weight of monomers in the polymerization mixture.

A wide variety of monomers may be used to prepare copolymers suitable for use in the composition of this invention. (Meth)acrylate copolymers comprising primarily (meth)acrylate monomers are one desirable type of copolymer.

For the purposes of the emulsion polymer latex of the present invention, the term "(meth)" indicates that the methyl substituted compound is included in the class of compounds modified by that term. For example, the term (meth)acrylic acid represents acrylic acid and methacrylic acid.

With reference the emulsion polymer latex of the present invention, as used herein the term "(meth)acrylate copolymer" means a copolymer that contains in polymerized form at least 80 weight percent (meth)acrylate monomers and (meth)acrylic acid monomers. In a preferred embodiment, the copolymer contains in polymerized form at least 90 weight percent (meth)acrylate monomers and (meth)acrylic acid monomers, while even more preferred is the embodiment wherein the copolymer contains in polymerized form at least 95 weight percent (meth)acrylate monomers and (meth)acrylic acid monomers.

In a highly preferred embodiment, the copolymer is a pure (meth)acrylate, or a pure (meth)acrylate except for the inclusion of a non-(meth)acrylate seed therein. These copolymers desirably consist essentially of (meth)acrylate monomers, or of (meth)acrylate monomers and (meth)acrylic acid monomers.

With reference the emulsion polymer latex of the present invention, as used herein the term "(meth)acrylate monomers" is meant to include those monomers that are used to prepare the (meth)acrylate copolymers that are suitable for use in the compositions of this invention. Included therein are conventionally known acrylates, such as, for example, alkyl esters of acrylic acid, represented by the formula $CH_2=CHCOOR$, and methacrylic acid, represented by the formula $CH_2=CCH_3COOR$, where R is a hydrocarbyl or a substituted hydrocarbyl group containing from 1 to 16 carbon atoms. The term "(meth)acrylic acid monomers" is meant to include acrylic acid, methacrylic acid and substituted derivatives thereof.

With reference the emulsion polymer latex of the present invention, as used herein the term "(meth)acrylate monomers" as used herein is meant also to include the monovinyl acrylate and methacrylate monomers. The (meth)acrylates can include esters, amides and substituted derivatives thereof. Generally, the preferred (meth)acrylates are $C_1$-$C_8$ alkyl acrylates and methacrylates.

Examples of suitable (meth)acrylates include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

Monomers suitable for use as components in polymers are often classified as "hard" or "soft" monomers, depending upon the glass transition temperature (Tg) of the homopolymer prepared from the monomer. As used herein, a hard monomer is characterized as having a Tg greater than 40° C. for its homopolymer, while a soft monomer is characterized as having a Tg of 40° C. or less for its homopolymer. A preferred hard (meth)acrylate monomer is methyl methacrylate.

The soft non-functional (meth)acrylate monomers have the formula:

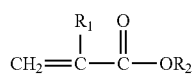

wherein $R_1$ is selected from the group consisting of hydrogen and methyl, and $R_2$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers include, but are not limited to, butyl acrylate, isobutyl acrylate, ethylhexyl acrylate, isodecyl methacrylate, lauryl methacrylate, tridecylmethacrylate. Butyl acrylate is a preferred soft, non-functional monomer.

Suitable non-ester monomers that are sometimes classified with the (meth)acrylates are the nitriles. A preferred nitrile monomer is acrylonitrile.

While the more highly preferred embodiment of the (meth)acrylate copolymer of the instant invention may contain up to about 5 weight percent of other comonomers that are not (meth)acrylate monomers, other embodiments may contain as other comonomers as much as 10 weight percent or even as much as 20 weight percent of monomers that are not (meth)acrylate monomers. Other monomers that are useful in these copolymers of the instant invention include vinyl aromatic monomers, aliphatic conjugated diene monomers, monoethylenically unsaturated carboxylic acid monomers, vinyl acetate monomer, vinylidene halide monomer and vinyl halide monomer. In some other desirable copolymers suitable for use in this invention, the monomers of the polymerization mixture include from 1 to about 40 weight percent of one or more (meth)acrylate monomers.

As used in the specification and claims, "vinyl aromatic monomers" are defined as any organic compound containing at least one aromatic ring and at least one aliphatic-containing moiety having vinyl unsaturation; provided. Illustrative vinyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. The preferred vinyl aromatic monomers are styrene and vinyltoluene; and due to its commercial availability and low cost, styrene is the more preferred vinyl aromatic monomer.

The term "conjugated diene monomer", as used herein, is meant to include compounds such as 1,3-butadiene, isoprene, 1,3-pentadiene, 2-ethyl-1,3-butadiene, and 4-methyl-1,3-pentadiene, 2-methyl-1,3-butadiene, piperylene (1,3-pentadiene), and other hydrocarbon analogs of 1,3-butadiene. The preferred alkadiene monomer is 1,3-butadiene. Other monomers inclusive as aliphatic conjugated dienes are halogenated compounds, such as, for example, 2-chloro-1,3-butadiene.

The monomers of the vinyl group, such as, for example, "vinylidene halides" and "vinyl halides", are suitable for inclusion in the copolymer of this invention, and include, for example, vinylidene chloride and vinyl chloride, which are highly preferred. Vinylidene bromides and vinyl bromide can also be employed. Another vinyl monomer within the vinyl group is vinyl acetate.

Suitable alpha, beta-ethylenically unsaturated aliphatic carboxylic acid monomers are monoethylenically unsaturated monocarboxylic, dicarboxylic and tricarboxylic acids having the ethylenic unsaturation alpha-beta to at least one of the carboxyl groups and similar monomers having a higher number of carboxyl groups. It is understood that the carboxyl groups may be present in the acid or salt form (—COOM in which M represents a cation such as ammonium, hydrogen or a metal such as, for example, sodium or potassium) and are readily interconvertible by well known simple procedures.

Specific examples of the alpha, beta-ethylenically unsaturated aliphatic carboxylic acids are acrylic acid, methacrylic acid, fumaric acid, itaconic acid, maleic acid, aconitic acid, various alpha-substituted acrylic acids such as alpha-ethacrylic acid, alpha-propyl acrylic acid and alpha-butyl acrylic acid. Highly preferred acid monomers are acrylic acid and methacrylic acid.

With regard to the amount of acid monomer that is desirable or preferred in the copolymer as discussed above, it appears that there is a trade-off in terms of the acid strength of the monomer as indicated by pKa in aqueous solution and the amount of the acid monomer desirably included in the copolymer. While a higher acid content can be tolerated and may be desirable for relatively weak acid monomers, for those acid monomers that are relatively stronger acid monomers, the acid content of the copolymer is desirably less.

In preferred embodiments, the content of alpha, beta-ethylenically unsaturated aliphatic carboxylic acid monomers in the copolymer is desirably in the range from 0 to 4 weight percent, more preferably from 0.2 to 3 weight percent, still more preferably from 0.3 to 2 weight percent.

Within the scope of this invention are other embodiments wherein the copolymer utilized would not be classified as a (meth)acrylate copolymer. Other copolymer types that can be utilized include, for example, combinations of vinyl aromatic monomers with (meth)acrylate monomers, such as, for example, the styrene acrylates, and of vinyl aromatic monomers with conjugated diene monomers, such as, for example, styrene butadiene copolymers. These copolymers may be non-carboxylated or carboxylated.

The copolymer desirably is made, for example, by charging the monomeric ingredients, water, and a surfactant (when employed) into a reaction vessel, purging the reaction vessel with an inert gas, such as, for example, nitrogen, to remove essentially all the oxygen from the reactor vessel, and heating the reactor vessel to the reaction temperature, usually from 80° to 100° C. When the reactor vessel reaches the desired reaction temperature, an initiator is then added to the reaction vessel, and the reaction is continued for 2 to 4 hours. After the reaction is completed, the reactor vessel is cooled. This synthesis yields an aqueous copolymeric composition comprising the copolymer in water. In some instances, the composition has the appearance of a milky liquid, while in other instances it looks like a clear solution.

The process of production of the copolymer may include the use of a seed, which may be a (meth)acrylate, polystyrene or any other seed useful to control the ultimate particle size of the copolymer produced, or otherwise useful in the production thereof. As is well known in the art, the regulation of initial seed can be used to control the ultimate range of particle sizes of the copolymer produced. Useful copolymer particle sizes are in the range of from 700 to 10,000 angstroms.

Anionic, nonionic, and amphoteric surface active compounds, that is, surfactants, can be employed in the copolymer synthesis process. However, in some instances, no surfactant is required. Exemplary anionic, nonionic, and amphoteric surfactants are SIPONATE A246L brand surfactant available from Rhone-Poulenc, polyoxyethylene alkyl phenol surfactants, and N,N-bis-carboxyethyl lauramine, respectively. Another useful surfactant is DOWFAX 2EP, the sodium salt of dodecylated sulfonated phenyl ether, which is available from The Dow Chemical Company, Midland, Mich. 48640, U.S.A.

Filler for the Coating Composition

The coating composition may further comprise one or more fillers. Such fillers include, but are not limited to, pigments. Such pigments used in paper coating are well known and widely commercially available. Exemplary pigments include, but are not limited, to clay, kaolin, talc, calcium carbonate, titanium dioxide, calcium aluminum pigments, satin white, synthetic polymer pigment, zinc oxide, barium sulphate, gypsum, silica, alumina trihydrate, mica, and diatomaceous earth. Additional exemplary pigments include, but are not limited to, other semetic clays and other types of inorganic nano fillers such as nano calcium carbonate, nano-mica, nano zinc oxide or other metal oxide. Exemplary preferred pigments include, but are not limited to, Kaolin, talc, calcium carbonate, titanium dioxide, satin white and synthetic polymer pigments, including hollow polymer pigments. The coating composition may comprise less than 75 percent by weight of one or more fillers, based on the total weight of the coating composition. All individual values and subranges from less than 75 weight percent are included herein and disclosed herein; for example; for example, the coating composition may comprise less than 65 percent by weight of one or more fillers, based on the total weight of the coating composition; or in the alternative, the coating composition may comprise less than 55 percent by weight of one or more fillers, based on the total weight of the coating composition; or in the alternative, the coating composition may comprise less than 45 percent by weight of one or more fillers, based on the total weight of the coating composition; or in the alternative, the coating composition may comprise less than 35 percent by weight of one or more fillers, based on the total weight of the coating composition; or in the alternative, the coating composition may comprise less than 25 percent by weight of one or more fillers, based on the total weight of the coating composition.

Substrate

The substrate generally comprises cellulosic materials. Such cellulosic-based substrates are generally referred to as paper and/or paperboard products, such as newsprint, uncoated groundwood, coated groundwood, coated free sheet, uncoated free sheet, packaging and industrial papers, linerboard, corrugating medium, recycled paperboard, bleached paperboard, writing paper, typing paper, photo quality paper, wallpaper, paper towel, toilet papers, wipes, and etc. Such cellulosic-based substrates can generally be formed from at least one or more paper webs. For example, in one embodiment, the cellulosic-based substrates can contain a single-layered paper web formed from a blend of fibers. In another embodiment, the cellulosic-based substrates can contain a multi-layered paper (i.e., stratified) web. Furthermore, the cellulosic-based substrates can also be a single- or multi-ply product (e.g., more than one paper web), wherein one or more of the plies may contain a paper web formed according to the present invention. Normally, the basis weight of a cellulosic-based substrate of the present invention is between 10 to 525 grams per square meter (gsm). Normally, the specific volume of cellulosic-based substrates in accordance with embodiments of the present invention is between 0.3 to 15 grams per cubic centimeter (g/cc).

Any of a variety of materials can be used to form the cellulosic-based substrates of the present invention. For example, the material used to make cellulosic-based substrates can include fibers formed by a variety of pulping processes, such as kraft pulp, sulfite pulp, thermomechanical pulp, and the like.

Papermaking fibers useful in the process of the present invention include, but are not limited to, any cellulosic fibers that are known to be useful for making cellulosic base sheets. Exemplary fibers include, but are not limited to, virgin softwood and hardwood fibers along with non-woody fibers, as well as secondary (i.e., recycled) papermaking fibers and mixtures thereof in all proportions. Non-cellulosic synthetic fibers can also be utilized. Papermaking fibers may be derived from wood using any known pulping process, including, but not limited to, kraft and sulfite chemical pulps.

Exemplary fibers for making paper webs comprise any natural or synthetic cellulosic fibers including, but not limited to, nonwoody fibers, such as cotton, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers can be prepared in high-yield or low-yield forms and can be pulped in any known method, including, but not limited to, kraft, sulfite, high-yield pulping methods and other known pulping methods. Fibers prepared from organosolv pulping methods can also be used, including, but not limited to, the fibers and methods disclosed in U.S. Pat. No. 4,793,898, issued Dec.

27, 1988 to Laamanen et al.; U.S. Pat. No. 4,594,130, issued Jun. 10, 1986 to Chang et al.; and U.S. Pat. No. 3,585,104, issued on Jun. 15, 1971 to Kleinert. Useful fibers can also be produced by anthraquinone pulping, exemplified by U.S. Pat. No. 5,595,628 issued Jan. 21, 1997, to Gordon et al.

In one embodiment, a portion of the fibers, such as up to 50 percent or less by dry weight, or from 5 percent to 30 percent by dry weight, can be synthetic fibers such as rayon, polyolefin fibers, polyester fibers, bicomponent sheath-core fibers, multi-component binder fibers, and the like. An exemplary polyethylene fiber is PULPEX®, available from Hercules, Inc. (Wilmington, Del.). Any known bleaching method can be used. Synthetic cellulose fiber types include rayon in all its varieties and other fibers derived from viscose or chemically-modified cellulose. Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500. In some other embodiments, portions of the fibers up to about 90 percent by dry weight may be synthetic fibers.

Other papermaking fibers that can be used in the present disclosure include, but are not limited to, paper broke or recycled fibers and high yield fibers. High yield pulp fibers are those papermaking fibers produced by pulping processes providing a yield of about 65 percent or greater, more specifically about 75 percent or greater, and still more specifically 75 percent to 95 percent. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

In some embodiments, the pulp fibers may include softwood fibers having an average fiber length of greater than 1 mm; for example, fiber length from 2 to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and the like. Exemplary commercially available pulp fibers suitable for the present invention include, but are not limited to, those available from Neenah Paper Inc. under the trade designations LONGLAC-19.

In some embodiments, hardwood fibers, such as eucalyptus, maple, birch, aspen, and the like, can also be used. In certain instances, eucalyptus fibers may be particularly desired to increase the softness of the web. Eucalyptus fibers can also enhance the brightness, increase the opacity, and change the pore structure of the paper to increase the wicking ability of the paper web. Moreover, if desired, secondary fibers obtained from recycled materials may be used, such as fiber pulp from sources such as, for example, newsprint, reclaimed paperboard, and office waste. Further, other natural fibers can also be used in the present invention, such as abaca, sabai grass, milkweed floss, pineapple leaf, and the like. In addition, in some instances, synthetic fibers can also be utilized. Some suitable synthetic fibers can include, but are not limited to, rayon fibers, ethylene vinyl alcohol copolymer fibers, polyolefin fibers, polyesters, and the like.

The cellulosic-based substrates can be formed from one or more paper webs. The paper webs can be single-layered or multi-layered. For instance, in one embodiment, the cellulosic-based substrates contains a single-layered paper web layer that is formed from a blend of fibers. For example, in some instances, eucalyptus and softwood fibers can be homogeneously blended to form the single-layered paper web.

In another embodiment, the cellulosic-based substrates can contain a multi-layered paper web that is formed from a stratified pulp furnish having various principal layers. For example, in one embodiment, the cellulosic-based substrates contains three layers where one of the outer layers includes eucalyptus fibers, while the other two layers include northern softwood kraft fibers. In another embodiment, one outer layer and the inner layer can contain eucalyptus fibers, while the remaining outer layer can contain northern softwood kraft fibers. If desired, the three principle layers may also include blends of various types of fibers. For example, in one embodiment, one of the outer layers can contain a blend of eucalyptus fibers and northern softwood kraft fibers. However, it should be understood that the multi-layered paper web can include any number of layers and can be made from various types of fibers. For instance, in one embodiment, the multi-layered paper web can be formed from a stratified pulp furnish having only two principal layers.

In this regard, in one embodiment of the present invention, at least a portion of the fibers of the cellulosic-based substrates can be treated with hydrolytic enzymes to increase strength and reduce lint. In particular, the hydrolytic enzymes can randomly react with the cellulose chains at or near the surface of the papermaking fibers to create single aldehyde groups on the fiber surface which are part of the fiber. These aldehyde groups become sites for cross-linking with exposed hydroxyl groups of other fibers when the fibers are formed and dried into sheets; thus, increasing sheet strength. In addition, by randomly cutting or hydrolyzing the fiber cellulose predominantly at or near the surface of the fiber, degradation of the interior of the fiber cell wall is avoided or minimized. Consequently, a cellulosic-based substrate made from these fibers alone, or made from blends of these fibers with untreated pulp fibers, show an increase in strength properties such as dry tensile, wet tensile, tear, etc.

The cellulosic-based substrates may contain a variety of fiber types both natural and synthetic. In one embodiment the cellulosic-based substrate comprises hardwood and softwood fibers. The overall ratio of hardwood pulp fibers to softwood pulp fibers within the cellulosic-based substrate, including individual sheets making up the product may vary broadly. The ratio of hardwood pulp fibers to softwood pulp fibers may range from 9:1 to 1:9, more specifically from 9:1 to 1:4, and most specifically from 9:1 to 1:1. In one embodiment of the present invention, the hardwood pulp fibers and softwood pulp fibers may be blended prior to forming the cellulosic substrate thereby producing a homogenous distribution of hardwood pulp fibers and softwood pulp fibers in the z-direction of the sheet. In another embodiment of the present invention, the hardwood pulp fibers and softwood pulp fibers may be layered so as to give a heterogeneous distribution of hardwood pulp fibers and softwood pulp fibers in the z-direction of the sheet. In another embodiment, the hardwood pulp fibers may be located in at least one of the outer layers of the cellulosic substrate and/or sheets wherein at least one of the inner layers may comprise softwood pulp fibers. In still another embodiment the cellulosic-based substrates contains secondary or recycled fibers optionally containing virgin or synthetic fibers.

In addition, synthetic fibers may also be utilized in the present invention. The discussion herein regarding pulp fibers is understood to include synthetic fibers. Exemplary polymers that may be used to form the synthetic fibers include, but are not limited to: polyolefins, such as, polyethylene, polypropylene, polybutylene, and the like; polyesters, such as polyethylene terephthalate, poly(glycolic acid) (PGA), poly(lactic acid) (PLA), poly(β-malic acid) (PMLA), poly(ε-caprolactone) (PCL), poly(ρ-dioxanone) (PDS), poly(3-hydroxybutyrate) (PHB), and the like; and, polyamides, such as nylon and the like. Synthetic or natural cellulosic polymers, including but not limited to: cellulosic esters; cellulosic ethers; cellulosic nitrates; cellulosic acetates; cellulosic acetate butyrates; ethyl cellulose; regenerated celluloses, such as viscose, rayon, and the like; cotton; flax; hemp; and mixtures thereof may also be used. The synthetic fibers may be located in one or all of the layers and sheets comprising the cellulosic-based substrate.

Cellulosic-based substrates can be formed by a variety of processes known to those skilled in the art. Machines may be configured to have a forming section, a press section, a drying section, and depending on the article formed, optionally a reel. Examples of the details of the process steps and schematic illustrations may be found in "Properties of Paper: An Introduction," 2nd edition, W. Scott and J. Abbott, TAPPI Press 1995. In a simplified description of the process, typically a dilute suspension of pulp fibers is supplied by a head-box and deposited via a sluice in a uniform dispersion onto a forming fabric of a conventional papermaking machine. The suspension of pulp fibers may be diluted to any consistency which is typically used in conventional papermaking processes. For example, the suspension may contain from 0.01 to 1.5 percent by weight pulp fibers suspended in water. Water is removed from the suspension of pulp fibers to form a uniform layer of pulp fibers. Other paper-making processes, paper-board manufacturing processes, and the like, may be utilized with the present invention. For example, the processes disclosed in U.S. Pat. No. 6,423,183 may be used.

The pulp fibers may be any high-average fiber length pulp, low-average fiber length pulp, or mixtures of the same. The high-average fiber length pulp typically have an average fiber length from 1.5 mm to 6 mm. An exemplary high-average fiber length wood pulp includes one available from the Neenah Paper Inc. under the trade designation LONGLAC 19.

The low-average fiber length pulp may be, for example, certain virgin hardwood pulps and secondary (i.e. recycled) fiber pulp from sources such as, for example, newsprint, reclaimed paperboard, and office waste. The low-average fiber length pulps typically have an average fiber length of less than about 1.2 mm, for example, from 0.7 mm to 1.2 mm.

Mixtures of high-average fiber length and low-average fiber length pulps may contain a significant proportion of low-average fiber length pulps. For example, mixtures may contain more than about 50 percent by weight of low-average fiber length pulp and less than about 50 percent by weight of high-average fiber length pulp. One exemplary mixture contains 75 percent by weight of low-average fiber length pulp and about 25 percent by weight of high-average fiber length pulp.

The pulp fibers used in the present invention may be unrefined or may be beaten to various degrees of refinement.

Small amounts of wet-strength resins and/or resin binders may be added to improve strength and abrasion resistance. Useful binders and wet-strength resins include, for example, KYMENE 557 H available from the Hercules Chemical Company and PAREZ 631 available from American Cyanamid, Inc. Cross-linking agents and/or hydrating agents may also be added to the pulp mixture. Debonding agents may be added to the pulp mixture to reduce the degree of hydrogen bonding if a very open or loose nonwoven pulp fiber web is desired. One exemplary debonding agent is available from the Quaker Chemical Company, Conshohocken, Pa., under the trade designation QUAKER 2008. The addition of certain debonding agents also appears to reduce the measured static and dynamic coefficients of friction and improve the abrasion resistance. The de-bonder is believed to act as a lubricant or friction reducer.

Coating Application

The coating composition may be applied on or into a substrate comprising cellulosic materials, as described hereinabove. The coating composition according to the instant invention may be coated on or into the a substrate comprising cellulosic materials by various techniques, for example, by spray coating, curtain coating, blade coating, coating with a roll coater or a gravure coater, brush coating, dipping, extrusion coating, flexo coating, and film coating. The coating may preferably be dried by heating the coated substrate, as described hereinbelow in further details.

When treating paper webs in accordance with the present disclosure, the coating composition can be applied to the web, e.g. cellulosic substrate, topically or can be incorporated into the web by being pre-mixed with the fibers that are used to form the web. When applied topically, the coating composition can be applied to the web when the web is wet or dry. In one embodiment, the coating composition may be applied topically to the web during a creping process. For instance, in one embodiment, the coating composition may be sprayed onto the web or onto a heated dryer drum to adhere the web to the dryer drum. The web can then be creped from the dryer drum. When the coating composition is applied to the web and then adhered to the dryer drum, the coating composition may be uniformly applied over the surface area of the web or may be applied according to a particular pattern.

When topically applied to a paper web, the coating composition may be sprayed onto the web, extruded onto the web, or printed onto the web. When extruded onto the web, any suitable extrusion device may be used, such as a slot-coat extruder or a melt blown dye extruder. When printed onto the web, any suitable printing device may be used. For example, flexo printing machine, an inkjet printer, or a rotogravure printing device may be used.

The coating composition may be applied or incorporated at any point in the paper manufacturing process. The point during the process at which the coating composition is incorporated into the cellulose-based substrate may depend upon the desired end properties of the cellulose-based product. Incorporation points may include pre-treatment of pulp, co-application in the wet end of the process, post treatment after drying but on the paper machine and topical post treatment. Incorporation of the coating composition of the present invention onto or in the cellulose-based structure may be achieved by any of several methods, as illustrated by the following non-limiting descriptions.

For example, in some embodiments, adhesion to the paper web of the coating composition in the form of a drum drying additive present between the paper web and a dryer drum surface, wherein a portion of the compound remains with the paper web when the paper web is separated from the dryer drum by peeling, pulling, action of an air knife, or any other means known in the art.

In other embodiments, direct addition of the coating composition to a fibrous slurry, such as by injection of the compound into a slurry prior to entry in the headbox. Slurry consistency can be from 0.2% to 50%, specifically from 0.2% to 10%, more specifically from 0.3% to 5%, and most specifically from 1% to 4%. When combined at the wet end with the aqueous suspension of fibers, a retention aid may also be present within the coating composition. For instance, in one particular embodiment, the retention aid may comprise polydiallyl dimethyl ammonium chloride. The coating composition may be incorporated into the paper web in an amount from 0.01% to 30% by weight, such as from 0.5% to 20% by weight. For instance, in one embodiment, the coating composition may be present in an amount up to about 10% by weight. The above percentages are based upon the solids that are added to the paper web.

In other embodiments, a coating composition spray can be applied to a paper web. For example, spray nozzles may be mounted over a moving web to apply a desired dose of a solution to the web that may be moist or substantially dry. Nebulizers may also be used to apply a light mist to a surface of a web.

In other embodiments, the coating composition can be printed onto a paper web, such as by offset printing, gravure printing, flexographic printing, ink jet printing, digital printing of any kind, and the like.

In other embodiments, the coating composition can be coated onto one or both surfaces of a paper web, such as blade coating, air knife coating, short dwell coating, cast coating, and the like.

In other embodiments, the coating composition can be extruded onto the surface of a paper web. For example, extrusion process is disclosed in PCT publication, WO 2001/12414, published on Feb. 22, 2001, herein incorporated by reference to the extent that it is non-contradictory herewith.

In other embodiments, the coating composition can be applied to individualized fibers. For example, comminuted or flash dried fibers may be entrained in an air stream combined with an aerosol or spray of the compound to treat individual fibers prior to incorporation into a paper web or other fibrous product.

In other embodiment, the dispersion may be heated prior to or during application to a paper web. Heating the composition can lower the viscosity for facilitating application. For instance, the additive composition may be heated to a temperature of from 50° C. to 150° C.

In other embodiments, a wet or dry paper web can be impregnated with a the coating composition as a solution or slurry, wherein the coating composition penetrates a significant distance into the thickness of the web, such as at least about 20% of the thickness of the web, more specifically at least about 30% and most specifically at least about 70% of the thickness of the web, including completely penetrating the web throughout the full extent of its thickness. One useful method for impregnation of a moist paper web is the HYDRA-SIZER® system, produced by Black Clawson Corp., Watertown, N.Y., as described in "New Technology to Apply Starch and Other Additives," *Pulp and Paper Canada,* 100(2): T42-T44 (February 1999). This system consists of a die, an adjustable support structure, a catch pan, and an additive supply system. A thin curtain of descending liquid or slurry is created which contacts the moving web beneath it. Wide ranges of applied doses of the coating material are said to be achievable with good run-ability. The system can also be applied to curtain coat a relatively dry web In other embodiments, the coating composition can be applied to a fibrous web using a foam application (e.g., foam finishing), either for topical application or for impregnation of the coating composition into the web under the influence of a pressure differential (e.g., vacuum-assisted impregnation of the foam). Principles of foam application of additives such as binder agents are described in U.S. Pat. No. 4,297,860, "Device for Applying Foam to Textiles," issued on Nov. 3, 1981 to Pacifici et al.; and, U.S. Pat. No. 4,773,110, "Foam Finishing Apparatus and Method," issued on Sep. 27, 1988 to G. J. Hopkins, both of which are herein incorporated by reference to the extent that they are non-contradictory herewith.

In still other embodiments, the coating composition can be applied by padding of a solution of the coating composition into an existing fibrous web. Roller fluid feeding of the coating composition for application to the paper web may also be used.

In other embodiments, application of the coating composition by spray or other means to a moving belt or fabric which in turn contacts the paper web to apply the chemical to the web, such as is disclosed in PCT publication, WO 01/49937 by S. Eichhorn, "A Method of Applying Treatment Chemicals to a Fiber-Based Planar Product Via a Revolving Belt and Planar Products Made Using Said Method," published on Jun. 12, 2001.

Topical application of the coating composition to a paper web may occur prior to drum drying in the process described above. In addition to applying the coating composition during formation of the paper web, the coating composition may also be used in post-forming processes. For example, in one embodiment, the coating composition may be used during a printing process. Specifically, once topically applied to either side of a paper web, the coating composition may adhering to the paper web. For example, once a paper web is formed and dried, in one embodiment, the coating composition may be applied to at least one side of the web. In general, the coating composition may be applied to only one side of the web, or the coating composition may be applied to each side of the web.

Before the coating composition is applied to an existing paper web, the solids level of the web may be about 10% or higher (i.e., the web comprises about 10 grams of dry solids and 90 grams of water, such as about any of the following solids levels or higher: 12%, 15%, 18%, 20%, 25%, 30%, 35%, 40%, 45%, 50%, 60%, 75%, 80%, 90%, 95%, 98%, and 99%, with exemplary ranges of from 30% to 100% and more specifically from 65% to 90%). The solids level of the web immediately after application of any of the coating composition may also be any of the previously mentioned solids levels.

The preferred coating weight of the polyolefin ranges from 2.5 to 300 kg polyolefin per metric ton (5 to 600 lb of polymer per ton) of cellulose article. More preferred coating weight of the polyolefin ranges from 5 to 150 kg per metric ton (10 to 300 lb of polymer per ton) of cellulose article. Most preferred thickness for the dried coating ranges from 10 to 100 kg polyolefin per metric ton (20 to 200 lb per ton).

In certain embodiments, the coated article may have a coat weight of less than 50 g/m$^2$. In an alternative embodiment, the coated article may have a coat weight of less than 40 g/m$^2$. In an alternative embodiment, the coated article may have a coat weight of less than 30 g/m$^2$. In an alternative embodiment, the coated article may have a coat weight of less than 40 g/m². In an alternative embodiment, the coated article may have a coat weight of less than 20 g/m². In an alternative embodiment, the coated article may have a coat weight of less than 10 g/m². In an alternative embodiment, the coated article may have a coat weight of less than 10 g/m². In an alternative embodiment, the coated article may have a coat weight in the range of 1 to 10 g/m²; or in another embodiments, the coated article may have a coat weight in the range of 1.0 and 5.0 g/m².

In certain embodiments, the coated article may have a coating thickness in the range of 0.1 to 100 microns. All individual values and subranges from 0.1 to 100 microns are included herein and disclosed herein; for example, the coated article may have a coating thickness from a lower limit of 1, 5, 10, 15, 20, 30, 40, 50, 60, 70, 80, or 90 microns to an upper limit of 5, 10, 20, 30, 40, 50, 60, 70, 80, 90, 95 microns. For example, the coated article may have a coating thickness in the range of 0.1 to 15, 0.1 to 10 microns, or 0.1 to 5 microns.

Once a paper web is produced according to one of the above described processes incorporating the coating composition, in accordance with the present disclosure, the web can be embossed, crimped, and/or laminated with other webs by applying pressure and/or heat to the web containing the coating composition. During the process, the coating composition can form embossments in the product and/or can form bond areas for bonding the paper web to other adjacent webs. Use of the coating composition enhances the embossing, crimping or lamination process in several ways. For instance, the embossed pattern can be much more defined due to the presence of the coating composition. Further, the embossing is not only water resistant but, unexpectedly, it has been discovered that a paper web containing the coating composition can be embossed without substantially weakening the web. In particular, it has been discovered that a paper web containing the coating composition can be embossed without reducing the tensile strength of the web in either the machine direction or the cross machine direction by more than about 5%. In fact, in some embodiments, the tensile strength of the web may actually be increased after the embossing process.

When forming multiple ply products, the resulting paper product may comprise two plies, three plies, or more. Each adjacent ply may contain the coating composition or at least one of the plies adjacent to one another may contain the coating composition. The individual plies can generally be made from the same or from a different fiber furnish and can be made from the same or a different process.

In other embodiments, the coating composition may be applied after a paper product has been manufactured. That is, a coating composition formed in accordance with embodiments of the present invention may be added to a prior formed by product, as by a paper converter for example. Embodiments of the present invention may be used in an "in-line process," that is during the manufacturing of the paper, or in an off-line application. One example is where paper is previously clay-coated on a machine. Then, that product may have the coating composition applied as an alternative to an extrusion coated structures.

Drying the Incorporated Coating Composition

The coating composition incorporated onto or into, for example, the substrate comprising cellulosic materials, as described hereinabove, may be dried via any conventional drying method. Such conventional drying methods include but, are not limited to, air drying, convection oven drying, hot air drying, microwave oven drying, and/or infrared oven drying. The coating composition incorporated onto or into, for example, the substrate comprising cellulosic materials may be dried at any temperature; for example, it may be dried at a temperature in the range of equal or greater than the melting point temperature of the base polymer; or in the alternative, it may be dried at a temperature in the range of less than the melting point of the base polymer. The coating composition incorporated onto or into, for example, the substrate comprising cellulosic materials may be dried at a temperature in the range of 60° F. (15.5° C.) to 700° F. (371° C.). All individual values and subranges from 60° F. (15.5° C.) to 700° F. (371° C.) are included herein and disclosed herein; for example, the coating composition incorporated onto or into, for example, the substrate comprising cellulosic materials may be dried at a temperature in the range of 60° F. (15.5° C.) to 500° F. (260° C.), or in the alternative, the coating composition incorporated onto or into, for example, the substrate comprising cellulosic materials may be dried at a temperature in the range of 60° F. (15.5° C.) to 450° F. (232.2° C.). The temperature of the coating composition incorporated onto or into, for example, the substrate comprising cellulosic materials may be raised to a temperature in the range of equal or greater than the melting point temperature of the base polymer for a period of less than about 40 minutes. All individual values and subranges from less than about 40 minutes are included herein and disclosed herein; for example, the temperature of the coating composition incorporated onto or into, for example, the substrate comprising cellulosic materials may be raised to a temperature in the range of equal or greater than the melting point temperature of the base polymer for a period of less than about 20 minutes, or in the alternative, the temperature of the coating composition incorporated onto or into, for example, the substrate comprising cellulosic materials may be raised to a temperature in the range of equal or greater than the melting point temperature of the base polymer for a period of less than about 5 minutes, or in another alternative, the temperature of the coating composition incorporated onto or into, for example, the substrate comprising cellulosic materials may be raised to a temperature in the range of equal or greater than the melting point temperature of the base polymer for a period in the range of 0.5 to 300 seconds. In another alternative, the temperature the coating composition incorporated onto or into, for example, the substrate comprising cellulosic materials may be raised to a temperature in the range of less than the melting point temperature of the base polymer for a period of less than 40 minutes. All individual values and subranges from less than about 40 minutes are included herein and disclosed herein; for example, the temperature of the coating composition incorporated onto or into, for example, the substrate comprising cellulosic materials may be raised to a temperature in the range of less than the melting point temperature of the base polymer for a period of less than about 20 minutes, or in the alternative, the temperature of the coating composition incorporated onto or into, for example, the substrate comprising cellulosic materials may be raised to a temperature in the range of less than the melting point temperature of the base polymer for a period of less than about 5 minutes, or in another alternative, the temperature of the coating composition incorporated onto or into, for example, the substrate comprising cellulosic materials may be raised to a temperature in the range of less than the melting point temperature of the base polymer for a period in the range of 0.5 to 300 seconds.

Drying the coating composition incorporated onto or into, for example, the substrate comprising cellulosic materials at a temperature in the range of less than the melting point temperature of the base polymer is important because it facilitates the formation of a film having a continuous stabilizing agent phase with a discrete base polymer phase dispersed therein the continuous stabilizing agent phase thereby improving the rebrokeability of the cellulose-based composition incorporating the coating composition.

Drying the coating composition incorporated onto or into, for example, the substrate comprising cellulosic materials at a temperature in the range of equal or greater than the melting point temperature of the base polymer is important because it facilitates the formation of a film having a continuous base polymer phase with a discrete stabilizing agent phase dispersed therein the continuous base polymer phase thereby improving the oil and grease resistance as well as providing a barrier for moisture and vapor transmission.

Optional Chemical Additives to the Coating Composition

Optional chemical additives may also be added to the coating composition or to the paper to impart additional benefits to the product and/or process and are not antagonistic to the intended benefits of the present invention. The following materials are included as examples of additional chemicals that may be applied to the paper sheet with or in addition to the coating composition of the present invention. Such additives may be added at any point in the papermaking process, such as before or after addition of the coating composition. They may also be added simultaneously with the coating composition. They may be blended with the coating composition.

Optional chemical additives which may be used in the present invention include those disclosed in U.S. Pat. Nos. 6,949,167 and 6,897,168, each of which is incorporated herein by reference. For example, the optional chemical additives can include: hydrophobic additives; wetting agents; binders; charge promoters or charge controllers; strength agents, including wet strength agents, temporary wet strength agents, and dry strength agents; debonders; softening agents; synthetic fibers; odor control agents; fragrances; absorbency aids, such as superabsorbent particles; dyes; brighteners; lotions or other skin care additives; detackifying agents; microparticulates; microcapsules and other delivery vehicles; preservatives and anti-microbial agents; cleaning agents; silicone; emollients; surface feel modifiers; opacifiers; pH control agents; and drying aids, among others.

The application point for such materials and chemicals is not particularly relevant to the present invention and such materials and chemicals may be applied at any point in the paper manufacturing process. This includes pre-treatment of pulp, co-application in the wet end of the process, post treatment after drying but on the paper machine and topical post treatment. The chemical additives may be combined and incorporated into a paper web along with the coating composition described above.

End-Use Applications:

Coated products prepared in accordance with the present invention can be used for a wide variety of applications, such as paper and paperboard products, newsprint, uncoated groundwood, coated groundwood, coated free sheet, uncoated free sheet, packaging and industrial papers, label paper, specialty papers such as security papers, photographic papers, inkjet papers, and the like, linerboard, corrugating medium, recycled paperboard, paper towels, tissues, and bleached paperboard. Webs made according to the present invention can be used in diapers, sanitary napkins, composite materials, molded paper products, paper cups, paper plates, and the like.

Advantages of the present invention include improved blocking. Blocking, as used herein, refers to the tendency of two or more adjacent layers of one or more paper sheets to stick together. The blocking, i.e. the tendency to stick together, may, for example, be observed in a paper roll, wherein the roll comprises a single sheet; or in the alternative, the blocking may be observed in a roll, wherein the roll may comprise a plurality, i.e. two or more, of paper sheets. Furthermore, the blocking may be observed in a stack, wherein the stack comprises a single sheet folded upon itself one or more times; or in the alternative, the blocking may observed in a stack, wherein the stack comprises a plurality, i.e. two or more, paper sheets.

Coated products according to instant invention may have any blocking properties; for example, the coated products according to instant invention may have a blocking value, according to the Constant Temperature Blocking Test described hereinbelow, in the range of less than 4. All individual values and subranges from less than 4 are included herein and disclosed herein; for example, the blocking value can be from a lower limit of 1, 2, or 3 to an upper limit of 2, 3, or 4. For example, the coated products according to instant invention may have a blocking value, according to the Constant Temperature Blocking Test, in the range of less than 3; or in the alternative, the coated products according to instant invention may have a blocking value, according to the Constant Temperature Blocking Test, in the range of less than 2; or in the alternative, the coated products according to instant invention may have a blocking value, according to the Constant Temperature Blocking Test, in the range of 2 to 4; or in the alternative, the coated products according to instant invention may have a blocking value, according to the Constant Temperature Blocking Test, in the range of 2 to 3. The coated articles of the present invention may have a fiber tear of less than 15 percent according to the Constant Temperature Blocking Test. All individual values and subranges from less than 15 percent are included herein and disclosed herein; for example, the fiber tear may be from a lower limit of 0, 1, 2, 3, 4, 5, 6, 7, 8, 9, 10, 11, 12, 13, or 14 percent to an upper limit of 1, 2, 3, 4, 5, 6, 7, 8, 9, 10, 11, 12, 13, 14, or 15 percent. For example, the fiber tear may be in the range of 0 to 15 percent; or in the alternative, the fiber tear may be in the range of 0 to 10 percent; or in the alternative, the fiber tear may be in the range of 0 to 5 percent; or in the alternative, the fiber tear may be in the range of 1 to 15 percent; or in the alternative, the fiber tear may be in the range of 1 to 10 percent; or in the alternative, the fiber tear may be in the range of 1 to 5 percent.

Coated products according to the instant invention may have a blocking temperature according to the Variable Temperature Blocking Test described below of between 60 at 105 degrees C., or in the alternative a blocking temperature of at least 75° C., or in the alternative in the range of from 70 to 105° C.

Examples

The following examples illustrate the present invention but are not intended to limit the scope of the invention. The following examples of the instant invention demonstrate the improved blocking properties of the coated paper products according to instant invention.

Inventive Examples 1 to 5, and Comparative Examples 1 and 2 were prepared according to the following procedure. The formulation components for Inventive Examples 1 to 5 and Comparative Examples 1 and 2, as shown in Table I and II, were admixed via an air mixer at a moderately low shears thereby producing Inventive Coating Composition 1 to 5 and Comparative Coating Compositions 1 and 2. The Inventive Coating Composition 1 and Comparative Coating Compositions 1 were subsequently applied to paper substrates via a wire coating device under controlled pressure thereby producing the Inventive Composite 1 and Comparative Composites 1 having controlled coat weight (8 g of coating composition per square meter of paper substrate). The Inventive Composite 1 and Comparative Composite 1 were then dried at 350° F. for approximately 3 minutes thereby producing Inventive Coated Paper Article 1 and Comparative Paper Article 1. Subsequently, these coated paper articles were tested for their blocking properties according to Constant Temperature Blocking Test described hereinbelow. The results are shown in Table III.

Comparative Sample 2 and Inventive samples 2, 3, 4 and 5 were coated at a wet thickness of 300 microns with a draw down bar onto the metal plate of a minimum film formation temperature, (MFFT) device. The films were allowed to dry for 20 minutes. This device has cooling and heating elements beneath the plate which allows a temperature gradient to be set up across the plate. The lower and upper limits of the temperature gradient were set at 40° C. for the left hand edge of the plate and 105° C. for the right hand side. The plate surface temperature at any point is proportional to the distance of that point from the edge of the plate, the centre of the plate being at 80° C., for example. These samples were tested for their blocking properties according to the Variable Temperature Blocking Test as described below. The results are shown in Table IV. In addition, Comparative Sample 2 and Inventive samples 2, 3, 4 and 5 were coated on a paperboard substrate (Stora Enso folding boxboard 240 g/m2) using an RK instruments lab coater using rod number 4, giving a 40 micrometer wet film deposit. The coated paperboard was dried in air oven at 100 C for 2 minutes. These results are also shown in Table IV.

Formulation Components:

DPOD 8501 is an aqueous dispersion provided by The Dow Chemical Company including a Affinity™ EG8200, an ethylene/1-octene copolymer having melt index of approximately 5 g/10 minutes according to ASTM D 1238, and a density in the range of 0.870 g/cc according to ASTM 792, which is commercially available from The Dow Chemical Company, as the base polymer, Primacor™ 5980i, an ethylene acrylic acid copolymer having melt flow rate of approximately 13.8 g/10 minutes (measured at the time of production) and a density of approximately 0.958 g/cc, which is commercially available from The Dow Chemical Company, as the stabilizing agent, and water as the media. To prepare the dispersion the base polymer and the stabilizing agent were melt kneaded in a twin screw extruder while sufficient amount of potassium hydroxide is continuously fed into a downstream injection port to neutralize the ethylene acrylic copolymer. This aqueous dispersion is then diluted with additional water.

Mocryl™ 132 is a resin in solution, having a pH in the range of 7.9 to 9.0, viscosity of 450 to 1500 CPS at 25° C., and a specific gravity of approximately 1.06 (water having specific gravity of 1), which comprises acrylic polymer (approximately 31-33 weight percent); water (approximately 65-67 weight percent); aqua ammonia (equal or less than 0.2 weight percent); dipropylene glycol monomethyl ether (approximately 1-2 weight percent); individual residual monomers (optional, less than 0.1 weight percent), which is commercially available from Rohn and Haas Company.

CP 615NA is a modified styrene-butadiene latex provided by The Dow Chemical Company, having approximately 50 weight percent solids; a pH of approximately 6.5, particle size of approximately 1200 angstroms; with a high level of carboxylation.

Bacote 20 is an Zirconium ammonium carbonate.

Zinc oxide is available from Sobeltec Fine Chemicals under the CAS No. 1314-13-2.

Test Methods

Test methods include the following:

The blocking on inventive sample 1 and comparative sample 1 was measured according to the following Constant Temperature Blocking Test Method. Two press platens were preheated to 140° F. A test sample (6"×6") was positioned between two pieces of blotter paper (6"×6") to form a composite. The composite was placed between the preheated press platens, and subjected to 1500 psi (pounds per square inch) of pressure at 140° F. for approximately 3 minutes. After 3 minutes was passed, the sample was removed from the press, and it was allowed to cool for approximately 15 seconds. Subsequently, the blotter sheets were pulled apart under a uniform and rapid force. The samples were observed for their blocking properties, and ranked according to the following scale. The percent of fiber tear was also determined and recorded.

| Ranking | Description |
| --- | --- |
| 0 | Sample sheet falls apart without any effort |
| 1 | Sample sheets come apart with slight adherence |
| 2 | Sample sheets come apart with slight tack |
| 3 | Sample sheets show noticeable tack, but no material transfer between sheets. |
| 4 | Sample sheets show noticeable tack but with some slight picking or material transfer between sheets. |
| 5 | Sample sheets show noticeable tack and can not be completely separated without fiber tear |

The blocking for comparative sample 2 and inventive samples 2, 3, 4 and 5 coated on film were measured according to the Variable Temperature Blocking Test, as described hereinafter. A strip of commercially available LWC (light weight coated) paper was placed over the dried film of the coating composition on the metal plate of the MFFT (Minimum Film Formation Temperature) device. A 2 kg metal roller is rolled the length of the test strip twice to affect good adhesion between the LWC paper strip and the dried film. The paper strip is then gently peeled away from the dried film starting at the lower temperature end. At a distance from the edge where the plate temperature equals the blocking temperature, the paper remains stuck to the film. (The distance indicates the temperature since the temperature gradient across the plate in known.)

The Cobb water resistance for comparative sample 2 and inventive samples 2, 3, 4 and 5 coated on paperboard was tested using Tappi Test Method T 441 om-90 with following conditions: (a) Test period: 2 minutes; (b) Sample size: 13 cm$^2$; and (c) Amount of deionized water: 100 ml.

Density was measured according to ASTM D 792-03, Method B, in isopropanol.

Melt index ($I_2$) was measured at 190° C. under a load of 2.16 kg according to ASTM D-1238-03.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene} = 0.431 (M_{polystyrene})$.

Polyethylene equivalent molecular weight calculations are performed using Viscotek TriSEC software Version 3.0.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety).

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Block Index

The ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \sum (w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\sum (w_i(BI_i - ABI)^2)}{\frac{(N-1)\sum w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the ATREF (i.e., analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the olefin block copolymer. $T_{AB}$ can be calculated from the mole fraction of ethylene (measured by NMR) using the following equation:

$$Ln\, P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$Ln\, P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $LnPX = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $Ln\, P_{XO} = \alpha/T_X + \beta$ using a measured value of $T_X$.

Once the block index (BI) for each preparative TREF fraction is obtained, the weight average block index, ABI, for the whole polymer can be calculated.

The present invention may be embodied in other forms without departing from the spirit and the essential attributes thereof, and, accordingly, reference should be made to the appended claims, rather than to the foregoing specification, as indicating the scope of the invention.

TABLE I

| Formulation Components | Units | Comparative 1 | Inventive 1 |
|---|---|---|---|
| DPOD 4501 | Weight Percent | 100 | 43.7 |
| CP 615NA | Weight Percent | — | 43.7 |
| Mocryl 132 | Weight Percent | — | 5.95 |
| Zinc Ammonium Carbonate | Weight Percent | — | 6.56 |

TABLE II

|  | Comparative 2 | Inventive 2 | Inventive 3 | Inventive 4 | Inventive 5 |
|---|---|---|---|---|---|
| DPDO 8501 | 100.00 | 100.00 | 100.00 | 100.00 | 100.00 |
| Bacote 20 |  | 3.00 | 6.00 |  |  |
| Zincoxide |  |  |  | 3.00 | 6.00 |
| Solids, (%) | 40 | 40 | 40 | 40 | 40 |
| pH-value | 10.25 | 10.07 | 9.97 | 10.37 | 10.32 |
| Brookfield Viscosity mPa * s, 20 rpm | 75 | 41 | 21 | 64 | 58 |
| Brookfield Viscosity, mPa * s 100 rpm | 79 | 51 | 45 | 72 | 69 |

TABLE III

|  | Base Paper | Coat Weight (lbs/3000) | Blocking Rating | Fiber Tear (%) |
|---|---|---|---|---|
| Comparative 1 | 42 lbs pre-coated | 3 | 5 | 20 |
| Inventive 1 | 42 lbs pre-coated | 3 | 3 | 0 |

TABLE IV

|  | Comparative 2 | Inventive 2 | Inventive 3 | Inventive 4 | Inventive 5 |
|---|---|---|---|---|---|
| Blocking temperature [° C.] | 70 | 77 | 105 | 105 | 105 |
| Cobb 2 min [g/m$^2$] | 17.0 | 10.0 | 3.0 | 28.1 | 29.2 |

We claim:

1. A coating composition consisting of:
   (1) at least 50 percent by weight of a dispersion, based on the total coating composition weight, wherein the dispersion comprises:
      from 20 to 50% by weight at least one or more base polymers selected from the group consisting of: (a) an ethylene-alpha-olefin interpolymer of ethylene and at least one or more first comonomers selected from the group consisting of propylene, a $C_4$ to $C_{20}$ linear, branched or cyclic diene, vinyl acetate, and a compound represented by the formula $H_2C\!=\!CHR$, wherein R is a $C_1$ to $C_{20}$ linear, branched or cyclic alkyl group or a $C_6$ to $C_{20}$ aryl group; or a combination of (a) with (b) a propylene-alpha-olefin interpolymer of propylene and at least one or more second comonomers selected from the group consisting of ethylene, a $C_4$ to $C_{20}$ linear, branched or cyclic diene, and a compound represented by the formula $H_2C\!=\!CHR$, wherein R is a $C_1$ to $C_{20}$ linear, branched or cyclic alkyl group or a $C_6$ to $C_{20}$ aryl group; wherein the at least one or more first comonomers or the at least one or more second comonomers is styrene-butadiene;
      at least one or more stabilizing agents wherein each of the at least one stabilizing agents is a polar polyolefin having a polar group as a comonomer or grafted monomer different from the base polymer; and
      from 30 to 55 volume percent water based on the solid weight; and
   (2) from 3 to 7 percent by weight of zirconium ammonium carbonate, based on the total weight of the coating composition,
   wherein said dispersion is characterized in having an average particle size from 0.8 μm to 1.2 μm and wherein when said composition is coated on to a substrate, said coated substrate has a blocking temperature in the range of from 70° C. to 105° C., measured in accordance with Variable Temperature Blocking Test.

* * * * *